United States Patent
Chen

(10) Patent No.: US 8,109,571 B2
(45) Date of Patent: Feb. 7, 2012

(54) CHILD SAFETY SEAT

(75) Inventor: Ying-Zhong Chen, Taipei (TW)

(73) Assignee: Excellerate Enterprise Co., Ltd., Taipei (TW)

( * ) Notice: Subject to any disclaimer, the term of this patent is extended or adjusted under 35 U.S.C. 154(b) by 309 days.

(21) Appl. No.: 12/556,578

(22) Filed: Sep. 10, 2009

(65) Prior Publication Data

US 2010/0060054 A1 Mar. 11, 2010

Related U.S. Application Data

(60) Provisional application No. 61/095,630, filed on Sep. 10, 2008.

(51) Int. Cl.
*A47C 3/00* (2006.01)
(52) U.S. Cl. .................. 297/284.9; 297/250.1; 297/396; 297/256.1
(58) Field of Classification Search .............. 297/250.1, 297/256.1, 411.36, 284.9, 396, 256.13
See application file for complete search history.

(56) References Cited

U.S. PATENT DOCUMENTS

| | | | | |
|---|---|---|---|---|
| 5,098,157 A * | 3/1992 | Surot | ......................... | 297/250.1 |
| 5,645,317 A | 7/1997 | Onishi | | |
| 5,890,762 A | 4/1999 | Yoshida | | |
| 6,478,377 B2 * | 11/2002 | Kassai et al. | ................ | 297/256.1 |
| 6,746,080 B2 | 6/2004 | Tsugimatsu | | |
| 6,811,216 B2 * | 11/2004 | Sedlack | ...................... | 297/250.1 |
| 6,834,915 B2 * | 12/2004 | Sedlack | .................... | 297/256.13 |
| 7,055,903 B2 * | 6/2006 | Balensiefer et al. | ..... | 297/256.11 |
| 7,059,677 B2 | 6/2006 | Balensiefer | | |
| 7,073,859 B1 * | 7/2006 | Wilson | ......................... | 297/256.1 |
| 7,207,628 B2 | 4/2007 | Eros | | |
| 7,246,852 B2 * | 7/2007 | Balensiefer | ................ | 297/250.1 |
| 7,370,912 B2 | 5/2008 | Williams | | |
| 7,452,031 B2 | 11/2008 | Woellert | | |
| 7,547,066 B2 * | 6/2009 | Mendenhall | ............... | 297/250.1 |
| 7,625,043 B2 | 12/2009 | Hartenstine | | |
| 7,901,003 B2 * | 3/2011 | Meeker et al. | ............. | 297/250.1 |
| 7,954,895 B2 | 6/2011 | Freeman | | |
| 2002/0043837 A1 * | 4/2002 | Kain | .......................... | 297/250.1 |
| 2004/0189068 A1 * | 9/2004 | Meeker et al. | ............. | 297/250.1 |
| 2007/0057545 A1 * | 3/2007 | Hartenstine et al. | ........ | 297/250.1 |
| 2007/0120403 A1 * | 5/2007 | Drexler | ....................... | 297/250.1 |
| 2008/0018152 A1 | 1/2008 | Vadai | | |

FOREIGN PATENT DOCUMENTS

| | | |
|---|---|---|
| CN | 201161560 Y | 12/2008 |
| EP | 0 631 903 A1 | 1/1995 |
| EP | 1 033 280 A2 | 9/2000 |
| EP | 1 122 120 A1 | 8/2001 |
| EP | 1 033 280 A3 | 11/2002 |
| EP | 1 621 395 A2 | 2/2006 |
| EP | 1 621 395 A3 | 4/2009 |

* cited by examiner

*Primary Examiner* — David Dunn
*Assistant Examiner* — Erika Garrett
(74) *Attorney, Agent, or Firm* — Winston Hsu; Scott Margo

(57) ABSTRACT

A child safety seat includes a seat body, a backrest, a first side wing, and an adjusting mechanism. The backrest is connected to the seat body. A hole is formed on the backrest and a first slot is formed on a first side of the backrest. A first side wing is movably disposed through the first slot. The adjusting mechanism is movably disposed in the hole of the backrest and is movably connected to the first side wing. The adjusting mechanism has an actuating part. The actuating part is operable for driving the first side wing to move relative to the first slot telescopically.

20 Claims, 19 Drawing Sheets

CHILD SAFETY SEAT

CROSS REFERENCE TO RELATED APPLICATIONS

This application claims the benefit of U.S. Provisional Application No. 61/095,630, which was filed on Sep. 10, 2008 and is incorporated herein by reference.

BACKGROUND OF THE INVENTION

1. Field of the Invention

The present invention relates to a child safety seat, and more specifically, to a child safety seat capable of adjusting width of side wing.

2. Description of the Prior Art

In general, to ensure safety of a child while traveling in car, many countries have legislated there has to be a child safety seat installed in the car for securing the child. To either absorb impact force during a car accident or make a child sitting on the child safety seat feel comfortable, there are usually side wings disposed on two sides of a backrest.

However, the said side wings are commonly fixed to the backrest. Thus, a user is incapable of adjusting the widths of the side wings relative to the backrest manually to cause the child safety seat to accommodate different children of different sizes.

SUMMARY OF THE INVENTION

The present invention provides a child safety seat comprising a seat body; a backrest connected to the seat body, a hole being formed on the backrest and a first slot being formed on a first side of the backrest; a first side wing movably disposed through the first slot; and an adjusting mechanism movably disposed in the hole of the backrest and movably connected to the first side wing, the adjusting mechanism having an actuating part; wherein the actuating part is operable for driving the first side wing to move relative to the first slot telescopically.

These and other objectives of the present invention will no doubt become obvious to those of ordinary skill in the art after reading the following detailed description of the preferred embodiment that is illustrated in the various figures and drawings.

DETAILED DESCRIPTION

First Embodiment

Figure 1:
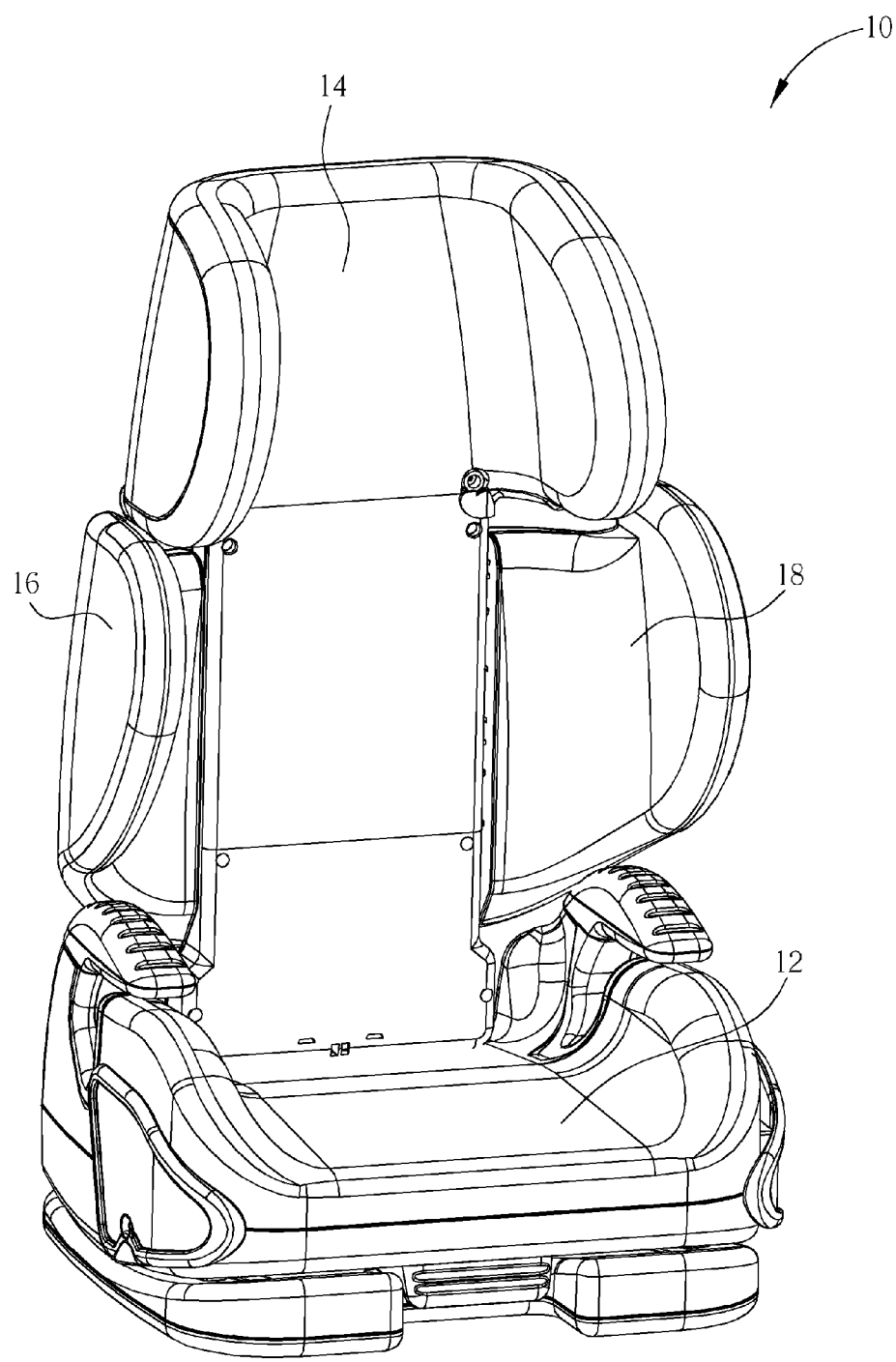
FIG. 1 is a diagram of a child safety seat according to a first preferred embodiment of the present invention.
Figure 2:
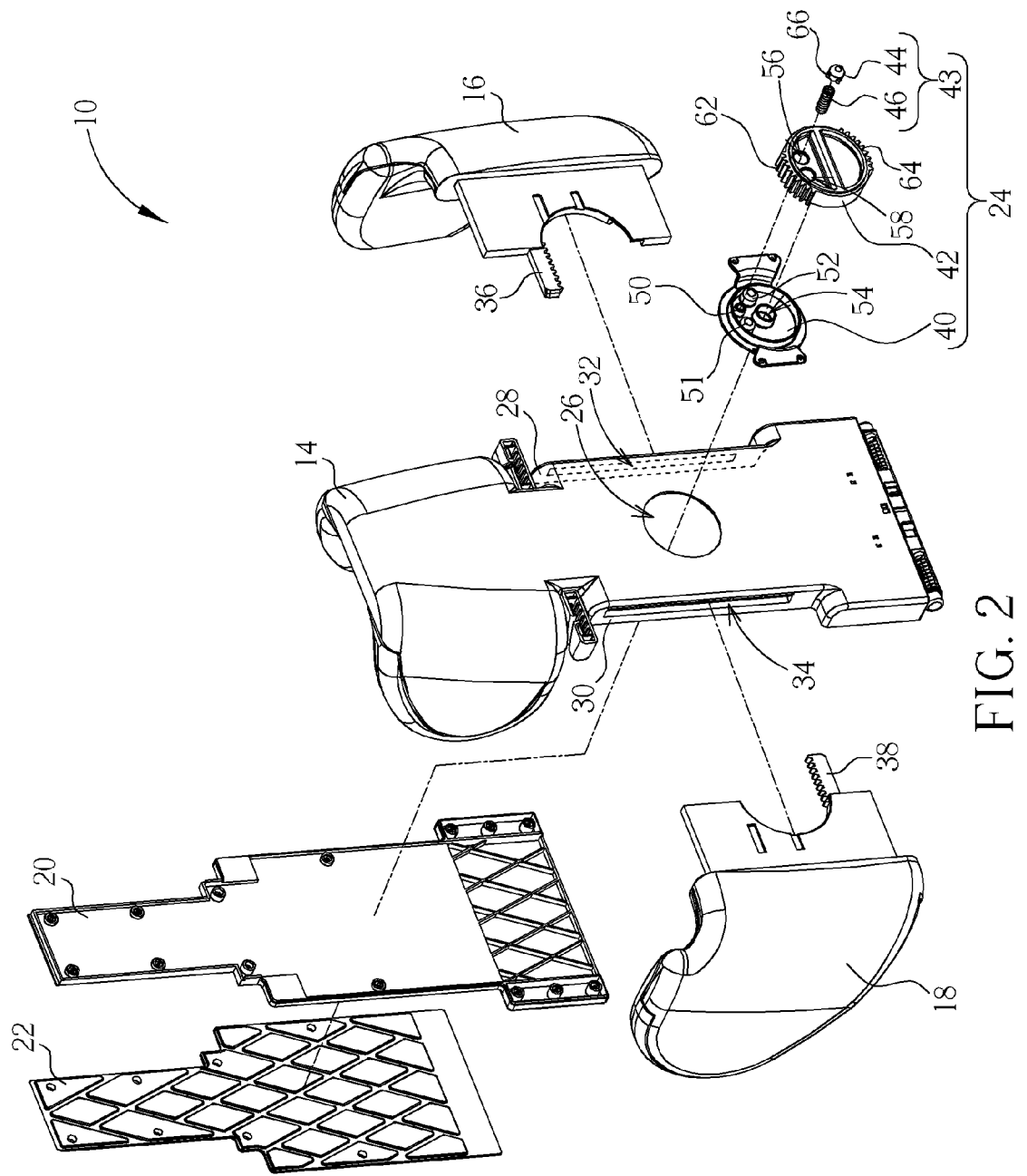
FIG. 2 is a partial exploded diagram of the child safety seat in FIG. 1.

Please refer to FIG. 1 and FIG. 2. FIG. 1 is a diagram of a child safety seat 10 according to a first preferred embodiment of the present invention. FIG. 2 is a partial exploded diagram of the child safety seat 10 in FIG. 1. As shown in FIG. 1, the child safety seat 10 includes a seat body 12 and a backrest 14. The seat body 12 may includes components commonly mounted on a child safety seat, such as a seat pad, an armrest, etc.

As shown in FIG. 2, the child safety seat 10 further includes a first side wing 16, a second side wing 18, a backrest lid 20, a protection pad 22, and an adjusting mechanism 24. The backrest 14 is connected to the seat body 12. A hole 26 is formed on the backrest 14. A first slot 32 and a second slot 34 are formed on a first side 28 and a second side 30 of the backrest 14, respectively. The first side wing 16 and the second side wing 18 are movably disposed through the first slot 32 and the second slot 34, respectively. A first rack structure 36 and a second rack structure 38 are formed on the first side wing 16 and the second side wing 18, respectively.

The backrest lid 20 is disposed on a front side of the backrest 14 for covering the adjusting mechanism 24. The protection pad 22 is disposed on the backrest lid 20. In this embodiment, the protection pad 22 may be made of flexible rubber material or expandable plastic material (preferably EPS (Expandable Polystyrene) material) for absorbing impact so as to securing a child sitting on the child safety seat 10 during a car accident.

Figure 3:
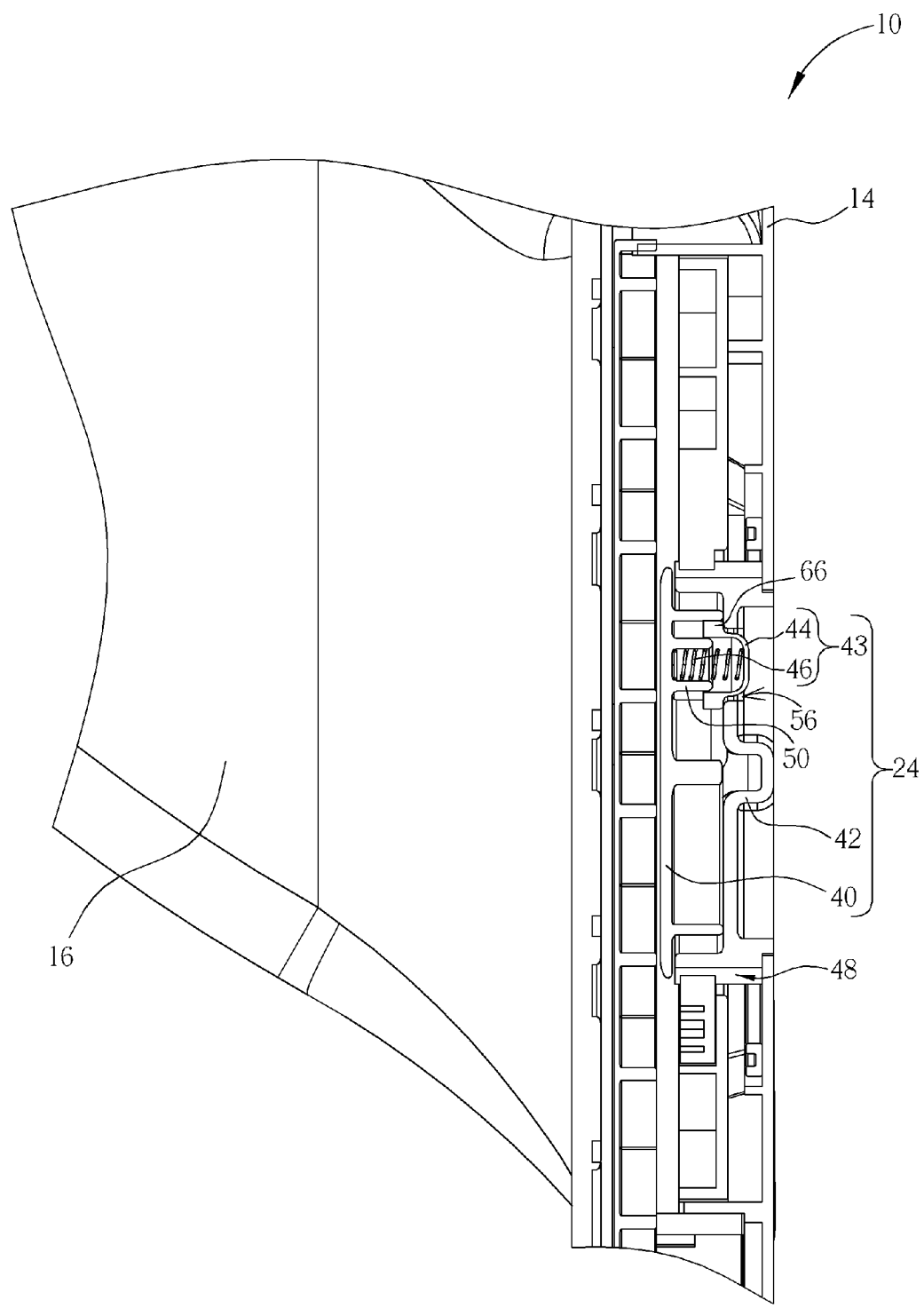
FIG. 3 is a sectional diagram of the adjusting mechanism in FIG. 2 being disposed in the hole of the backrest.

Next, structural design of the adjusting mechanism 24 is shown in FIG. 2 and FIG. 3. FIG. 3 is a sectional diagram of the adjusting mechanism 24 in FIG. 2 being disposed in the hole 26 of the backrest 14. The adjusting mechanism 24 is movably disposed in the hole 26 of the backrest 14. The adjusting mechanism 24 includes a fixing base 40, a driving part 42, and an actuating part 43. In this embodiment, the actuating part 43 includes an engaging part 44, and a spring 46.

As shown in FIG. 3, the fixing base 40 is disposed on the backrest 14 and forms a containing space 48 with the hole 26. As shown in FIG. 2, a first positioning pillar 50, protruding pillars 51 and 52, and a second positioning pillar 54 are formed on the fixing base 40. The protruding pillars 51 and 52 are disposed on two sides of the first positioning pillar 50, respectively. To avoid a child to stretch his finger into the first hole 56 or the second hole 58 so as to prevent the child's finger from being pinched, the protruding pillar 51 covers a second hole 58 when the engaging part 44 is engaged with a first hole 56, and the protruding pillar 52 covers the first hole 56 when the engaging part 44 is engaged with the second hole 58.

Figure 4:
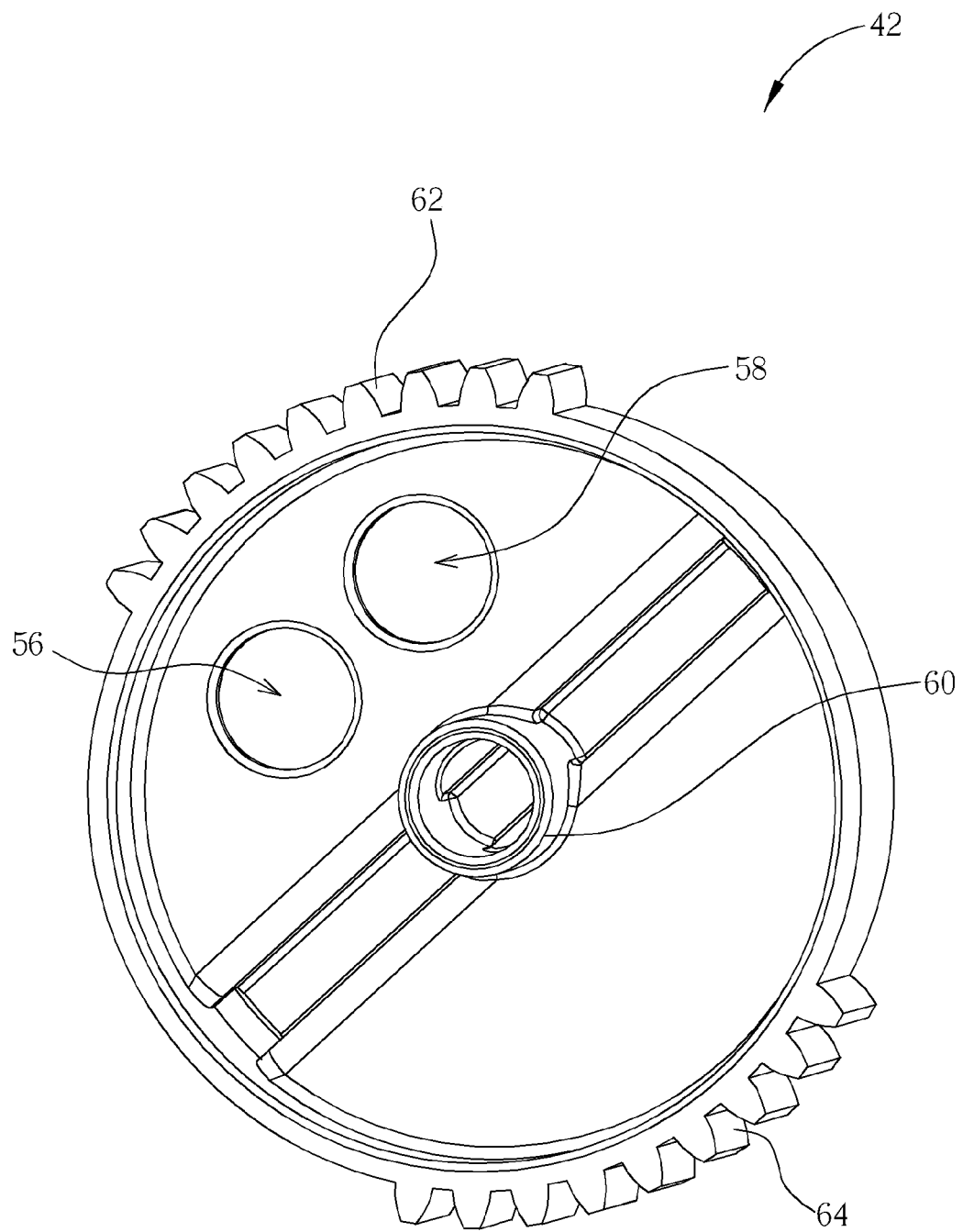
FIG. 4 is an enlarged diagram of the driving part in FIG. 2.

The driving part 42 is movably disposed in the containing space 48. That is, in this embodiment, the driving part 42 is capable of rotating relative to the fixing base 40 or the backrest 14. Next, please refer to FIG. 4, which is an enlarged diagram of the driving part 42 in FIG. 2. As shown in FIG. 4, besides the first hole 56 and the second hole 58, the driving part 42 further includes a hollow pillar 60, a first gear structure 62, and a second gear structure 64. The hollow pillar 60 is used for matching with the second positioning pillar 54 of the fixing base 40 so that the driving part 42 can rotate relative to the fixing base 40.

As shown in FIG. 2 and FIG. 4, the first gear structure 62 and the second gear structure 64 are used for engaging with the first rack structure 36 and the second rack structure 38, respectively. Thus, when the driving part 42 rotates relative to the backrest 14, the first rack structure 36 and the second rack structure 38 are driven accordingly so that the first side wing 16 and the second side wing 18 can move telescopically along the first slot 32 and the second slot 34, respectively.

Furthermore, as shown in FIG. 3, the engaging part 44 movably sheathes the first positioning pillar 50 of the fixing base 40. The spring 46 is disposed between the engaging part 44 and the first positioning pillar 50. The spring 46 is used for providing the engaging part 44 with elastic force. Therefore, the engaging part 44 can alternatively be engaged with the first hole 56 or the second hole 58 firmly so as to constrain rotation of the driving part 42 relative to the backrest 14. In other words, when the engaging part 44 separates from the first hole 56 or the second hole 58, the driving part 42 is capable of rotating relative to the backrest 14 for switching the engaging part 44 to alternatively engage with the first hole 56 or the second hole 58.

Furthermore, as shown in FIG. 2 and FIG. 3, at least one rib 66 is formed on the engaging part 44. The rib 66 is used for abutting against the edge of the first hole 56 when the engaging part 44 is engaged with the first hole 56, so as to prevent the engaging part 44 from falling out of the first hole 56 by elastic force provided from the spring 46. Similarly, when the engaging part 44 is engaged with the second hole 58, the rib 66 can also abut against the edge of the second hole 56 for the same purpose.

Figure 5:
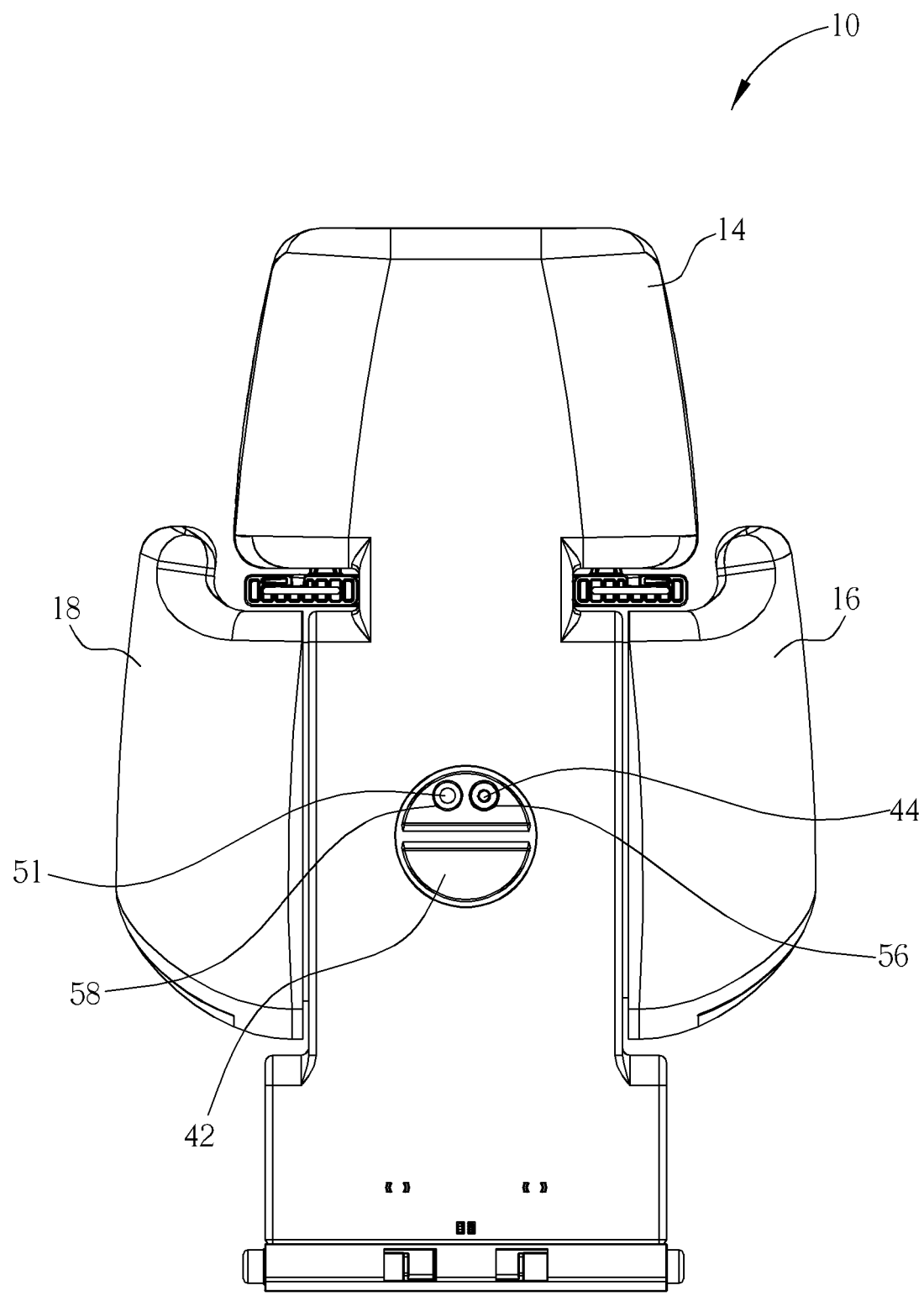
FIG. 5 is a partial back-view of the child safety seat in FIG. 1.
Figure 6:
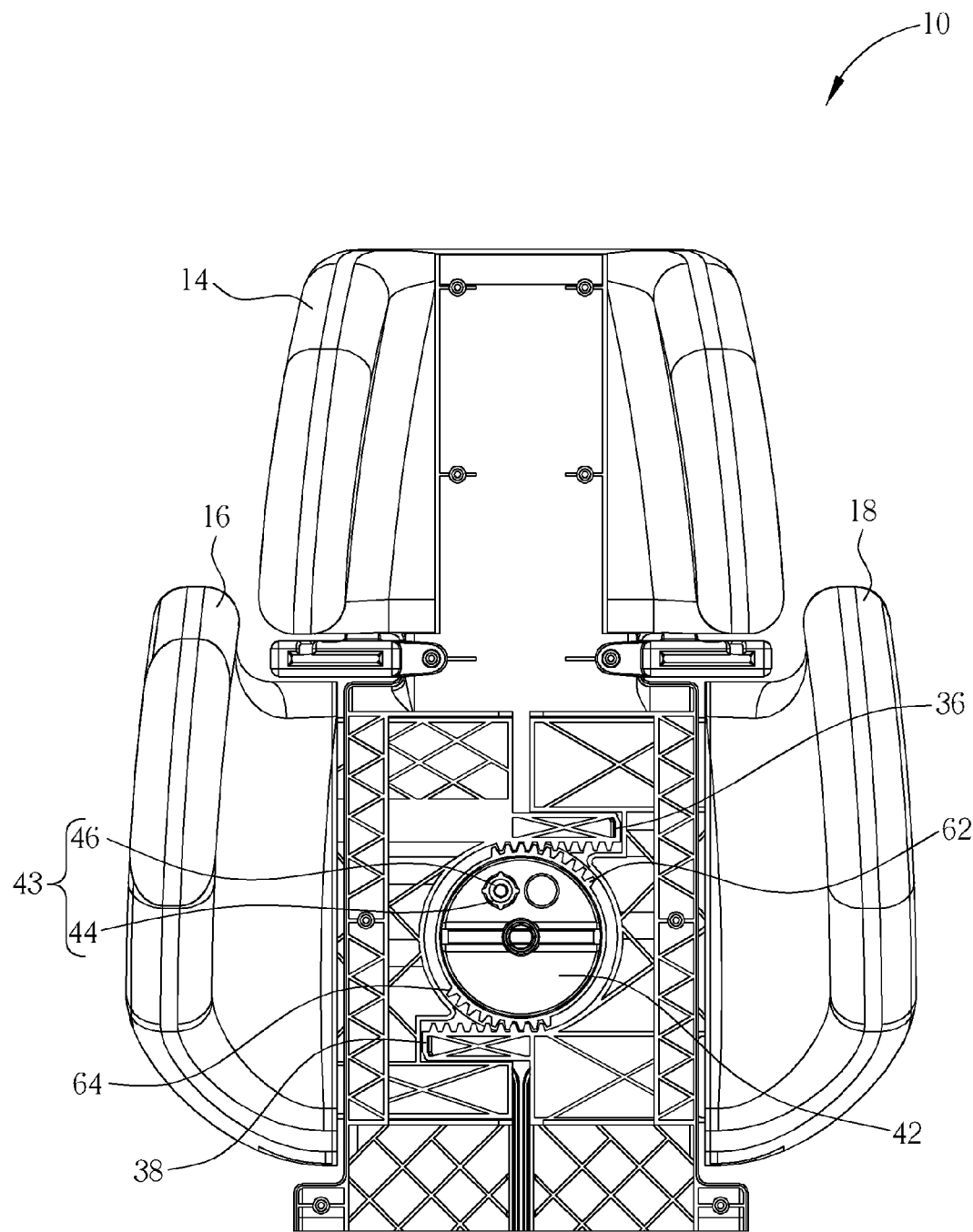
FIG. 6 is an inner diagram of the child safety seat in FIG. 1.

More detailed description for wing-width adjustment of the child safety seat 10 is provided as follows. Please refer to FIG. 3, FIG. 5, and FIG. 6. FIG. 5 is a partial back-view of the child safety seat 10 in FIG. 1. FIG. 6 is an inner diagram of the child safety seat 10 in FIG. 1. When the first side wing 16 and the second side wing 18 is located at a position as shown in FIG. 1 relative to the backrest 14, meaning that the first side wing 16 and the second side wing 18 are both in an unexpanded state, a position of the driving part 42 relative to the engaging part 44 is as shown in FIG. 3 and FIG. 6. At this time, a position of the first gear structure 62 relative to the first rack structure 36 and a position of the second gear structure 64 relative to the second rack structure 38 are both as shown in FIG. 6.

When the first side wing 16 and the second side wing 18 are both in an unexpanded state, the engaging part 44 is engaged with the first hole 56 of the driving part 42 by elastic force provided from the spring 46 (as shown in FIG. 3) so as to constrain rotation of the driving part 42 relative to the backrest 14. Therefore, the first side wing 16 and the second side wing 18 can be fixed at a position as shown in FIG. 5. In such a manner, when a child sits on the child safety seat 10, the child safety seat 10 may provide both sides of the child with a tight support so as to prevent the child from colliding and sliding in the child safety seat 10.

At the same time, as shown in FIG. 5, the protruding pillar 51 may cover the second hole 58 so as to prevent the child from stretching his hand into the second hole 58 and then being pinched.

Figure 7:
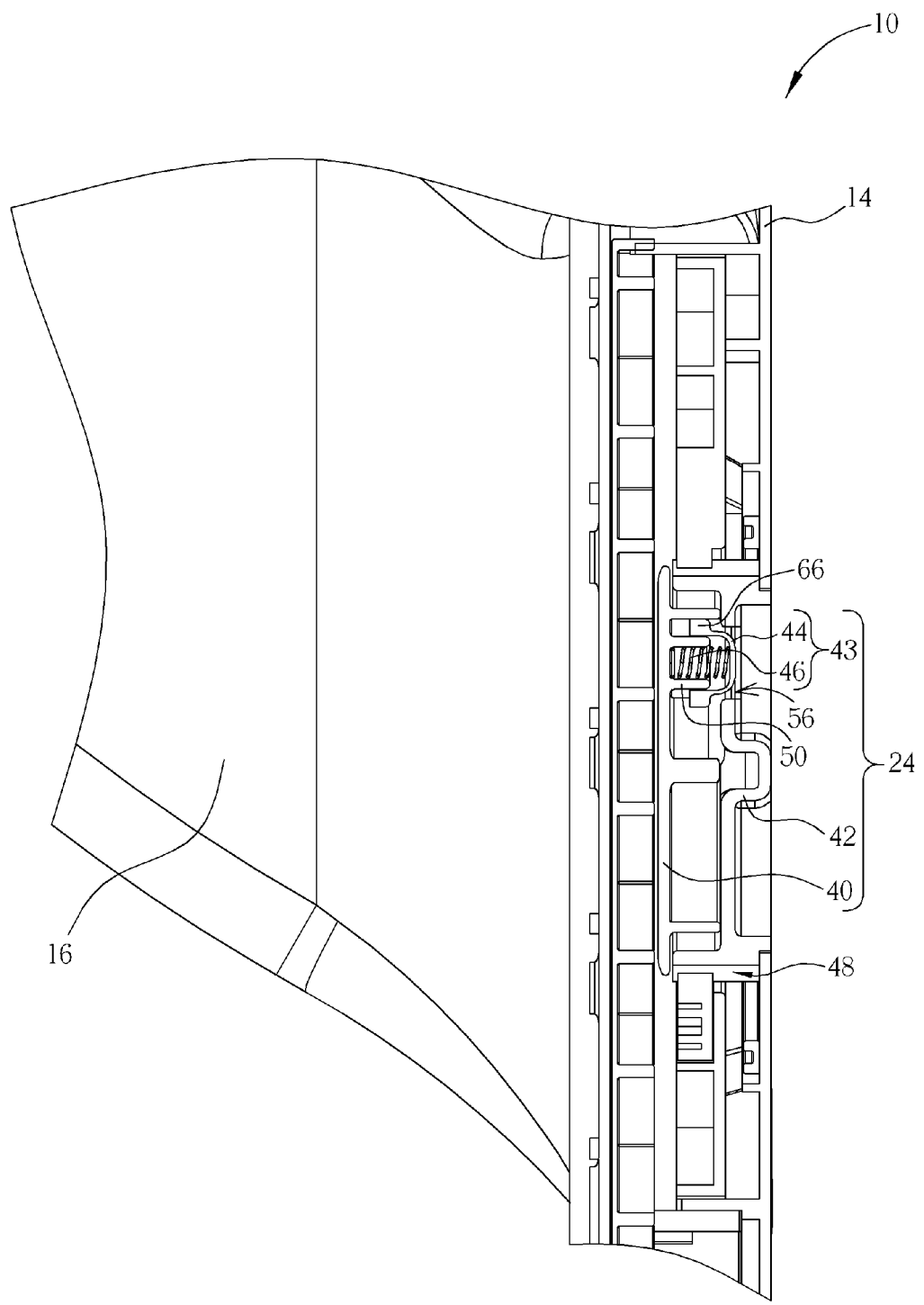
FIG. 7 is a sectional diagram of the engaging part in FIG. 3 separating from the first hole of the driving part.
Figure 8:
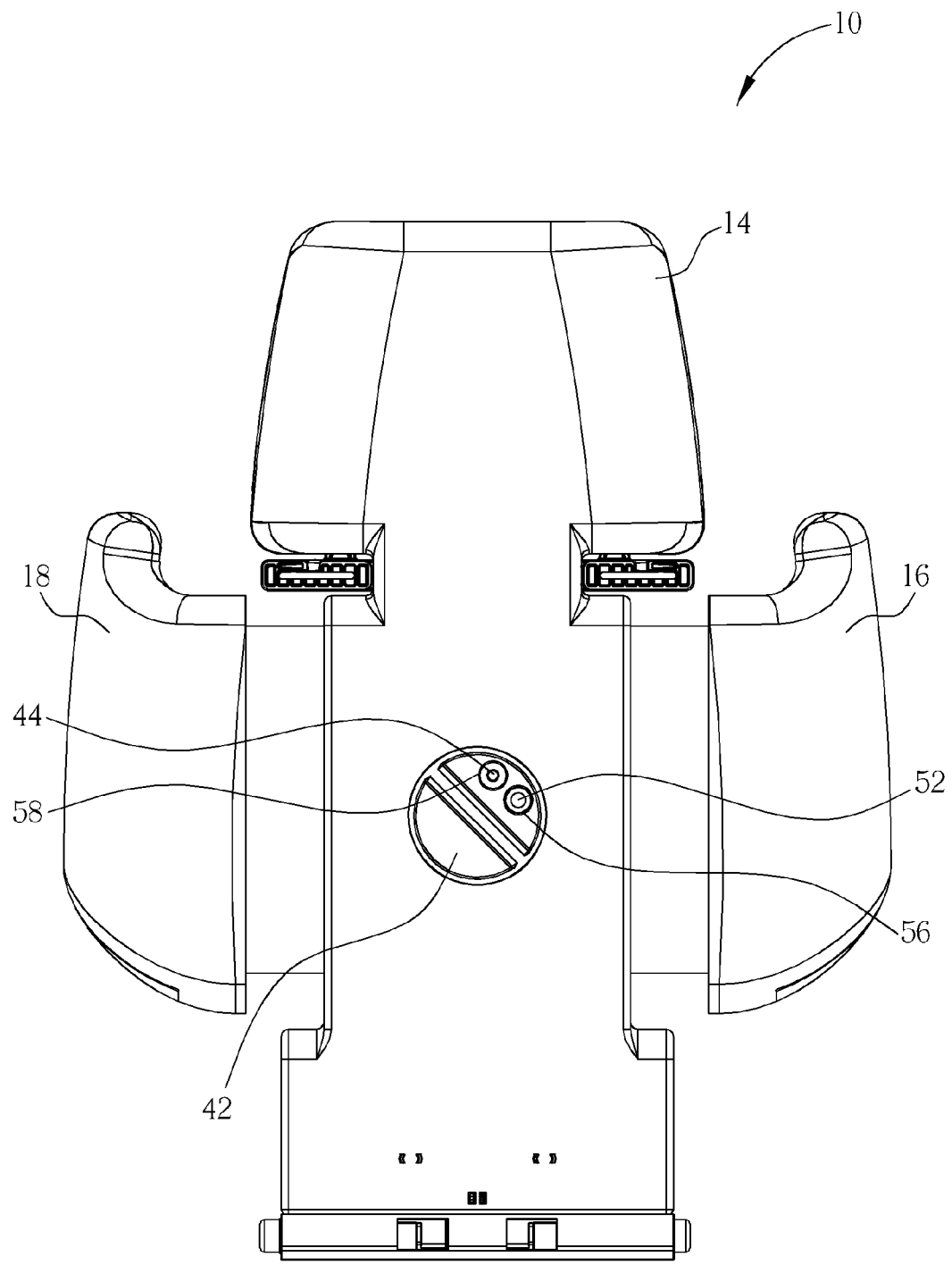
FIG. 8 is a diagram of the driving part in FIG. 5 rotating relative to the backrest to make the engaging part be engaged with the second hole.
Figure 9:
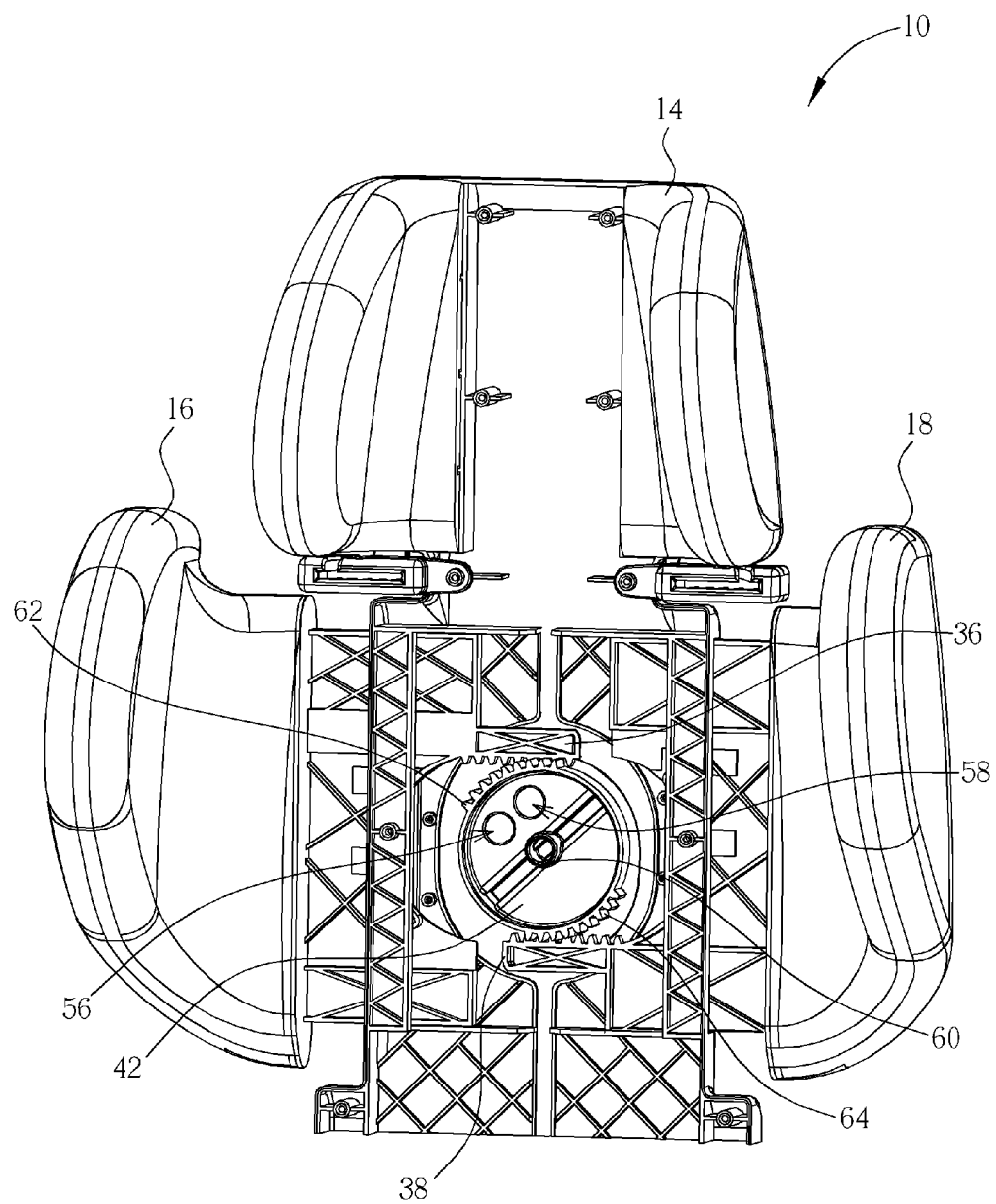
FIG. 9 is an inner diagram of the child safety seat in FIG. 8.

Next, please refer to FIG. 3, FIG. 5, FIG. 7, FIG. 8, and FIG. 9. FIG. 7 is a sectional diagram of the engaging part 44 in FIG. 3 separating from the first hole 56 of the driving part 42. FIG. 8 is a diagram of the driving part 42 in FIG. 5 rotating relative to the backrest 14 to make the engaging part 44 be engaged with the second hole 58. FIG. 9 is an inner diagram of the child safety seat 10 in FIG. 8.

When a user wants to expand widths of the first side wing 16 and the second side wing 18 relative to the backrest 14 to make the child safety seat 10 suitable for a baby of a larger size, or to provide the baby with a comfortable seating space, the user just needs to press the engaging part 44 in FIG. 5 to move the engaging part 44 from a position as shown in FIG. 3 to a position as shown in FIG. 7 (at this time, the spring 46 is compressed). When the engaging part 44 is no longer engaged with the first hole 56 of the driving part 42, the driving part 42 is capable of rotating relative to the backrest 14.

Subsequently, the user can rotate the driving part 42 clockwise from a position as shown in FIG. 5 to a position as shown in FIG. 8 relative to the backrest 14. With rotation of the driving part 42 relative to the backrest 14, the first gear structure 62 and the second gear structure 64 drive the first rack structure 36 and the second rack structure 38 to move, respectively. Consequently, the first side wing 16 and the second side wing 18 can move outwardly along the first slot 32 and the second slot 34, respectively, until the driving part 42 rotates to the position as shown in FIG. 8 relative to the backrest 14.

When the driving part 42 rotates to the position as shown in FIG. 8 relative to the backrest 14, the engaging part 44 is driven to engage with the second hole 58 by elastic force provided from the spring 46, so as to constrain rotation of the driving part 42 relative to the backrest 14. In such a manner, the first side wing 16 and the second side wing 18 can be fixed at the position as shown in FIG. 8 accordingly so as to achieve the purpose of increasing the wing width of the child safety seat 10. Furthermore, as shown in FIG. 8, the protruding pillar 52 may cover the first hole 56 for preventing the child's finger from being pinched.

Next, if the user wants to adjust the expanded wing-width of the child safety seat 10 back to the width as shown in FIG. 5, the user just needs to press the engaging part 44 again (at this time, the spring 46 is compressed). Subsequently, the user needs to rotate the driving part 42 counterclockwise from the position as shown in FIG. 8 to the position as shown in FIG. 5. With rotation of the driving part 42 relative to the backrest 14, the first gear structure 62 and the second gear structure 64 drive the first rack structure 36 and the second rack structure 38 to move, respectively. Consequently, the first side wing 16 and the second side wing 18 can move to a position as shown in FIG. 6 along the first slot 32 and the second slot 34, respectively, and the engaging part 44 is then engaged with the first hole 56 again by elastic force provided from the spring 46 so as to constrain rotation of the driving part 42 relative to the backrest 14. In such a manner, the first side wing 16 and the second side wing 18 can accordingly be fixed at the position as shown in FIG. 5 so that the expanded wing-width of the child safety seat 10 can be adjusted back to the width as shown in FIG. 5.

As mentioned above, the child safety seat 10 utilizes engagement of the driving part 42, the first side wing 16, the second side wing 18, and the engaging part 44 to adjust the widths of the first side wing 16 and the second side wing 18 relative to the backrest 14. It should be noted that the widths of the first side wing 16 and the second side wing 18 relative to the backrest 14 depend on the travelling distances of the first side wing 16 and the second side wing 18 relative to the backrest 14. In summary, if the user wants to adjust the widths of the first side wing 16 and the second side wing 18 relative to the backrest 14, the user just needs to perform the said process sequentially to move the first side wing 16 and the second side wing 18 between two different positions so that the child safety seat 10 can provide a proper seating space to fit the child's size.

It should be mentioned that number of the holes on the fixing base 42 is not limited to that mentioned in the said embodiment. That is, number of the holes on the fixing base 42 may vary with practical applications of the child safety seat 10 so as to provide the child safety seat 10 with a function of stepwise wing-width adjustment. Thus, wing-width adjustment of the child safety seat 10 may be more flexible.

Second Embodiment

Figure 10:
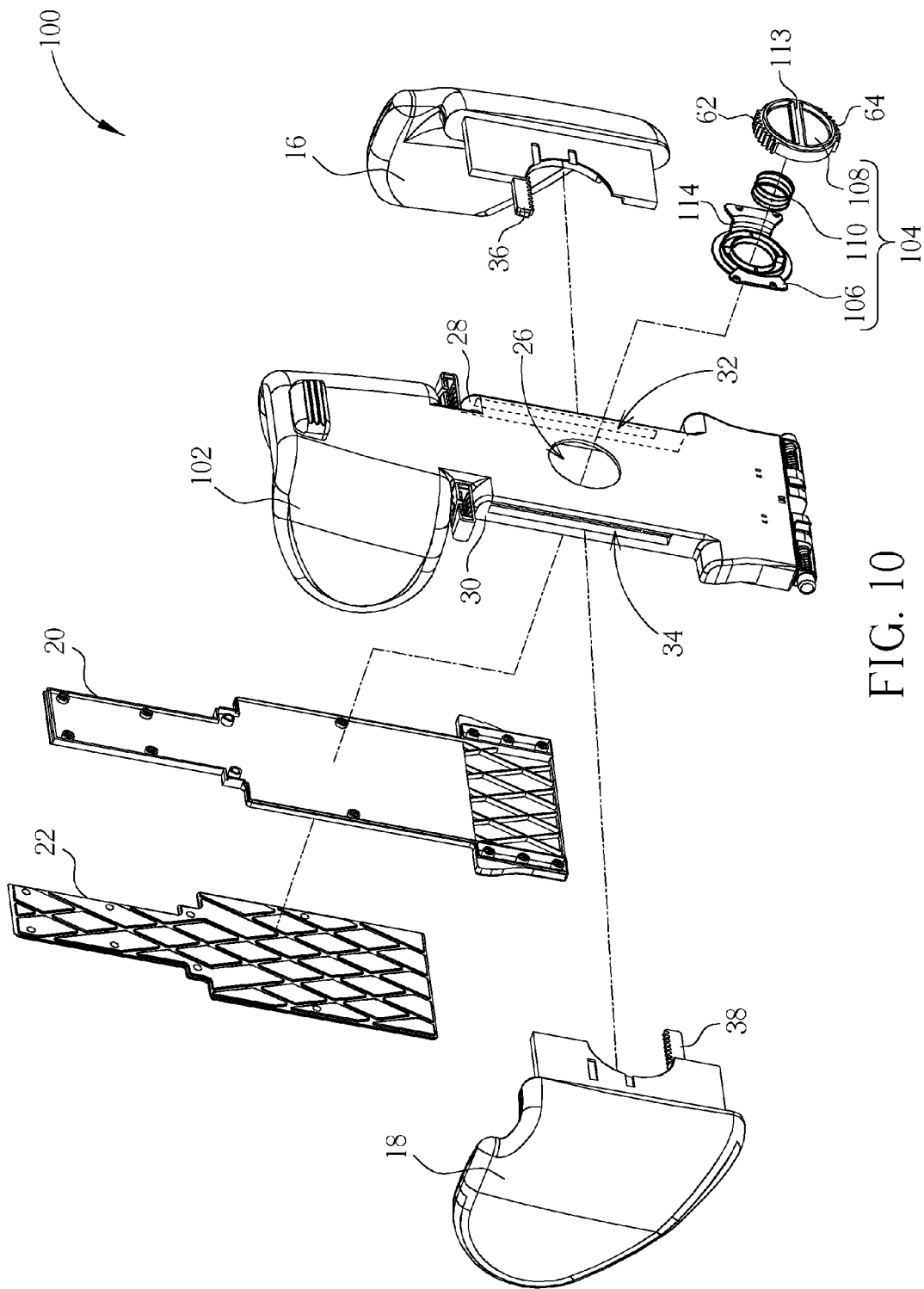
FIG. 10 is a partial exploded diagram of a child safety seat according to a second preferred embodiment of the present invention.

Please refer to FIG. 10, which is a partial exploded diagram of a child safety seat 100 according to a second preferred embodiment of the present invention. Components, functions, and positions both mentioned in the first embodiment and the second embodiment represent similar components, functions, and positions, and the related description is therefore omitted herein. The major difference between the child safety seat 100 and the child safety seat 10 is structural design of adjusting mechanism. Besides the seat body 12 as shown in FIG. 1, the child safety seat 100 further includes the first side wing 16, the second side wing 18, the backrest lid 20, the protection pad 22, a backrest 102, and an adjusting mechanism 104. For simplicity, only the backrest 102 and the adjusting mechanism 104 are described in detail as follows.

Figure 11:
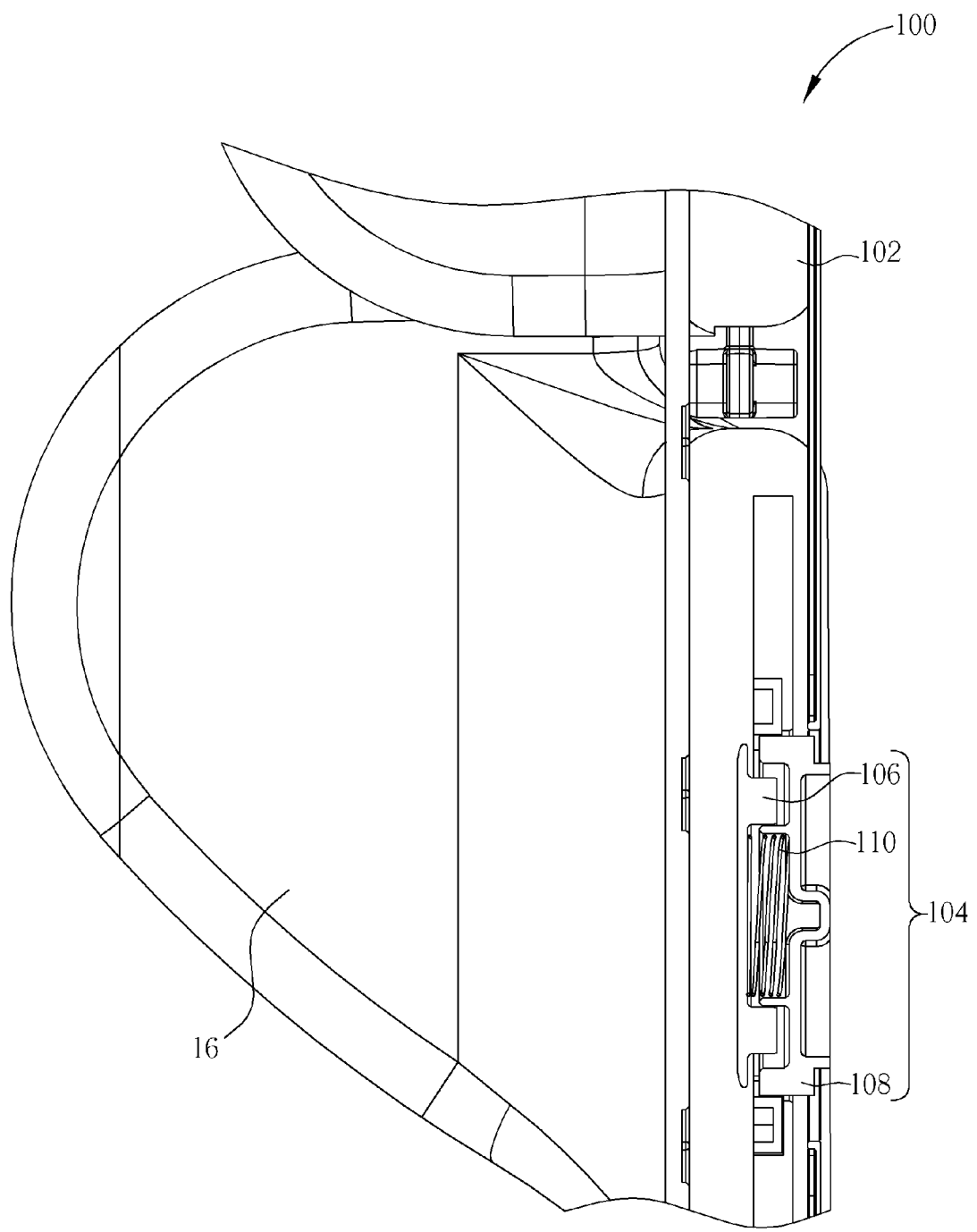
FIG. 11 is a sectional diagram of the adjusting mechanism being disposed in the backrest.
Figure 12:
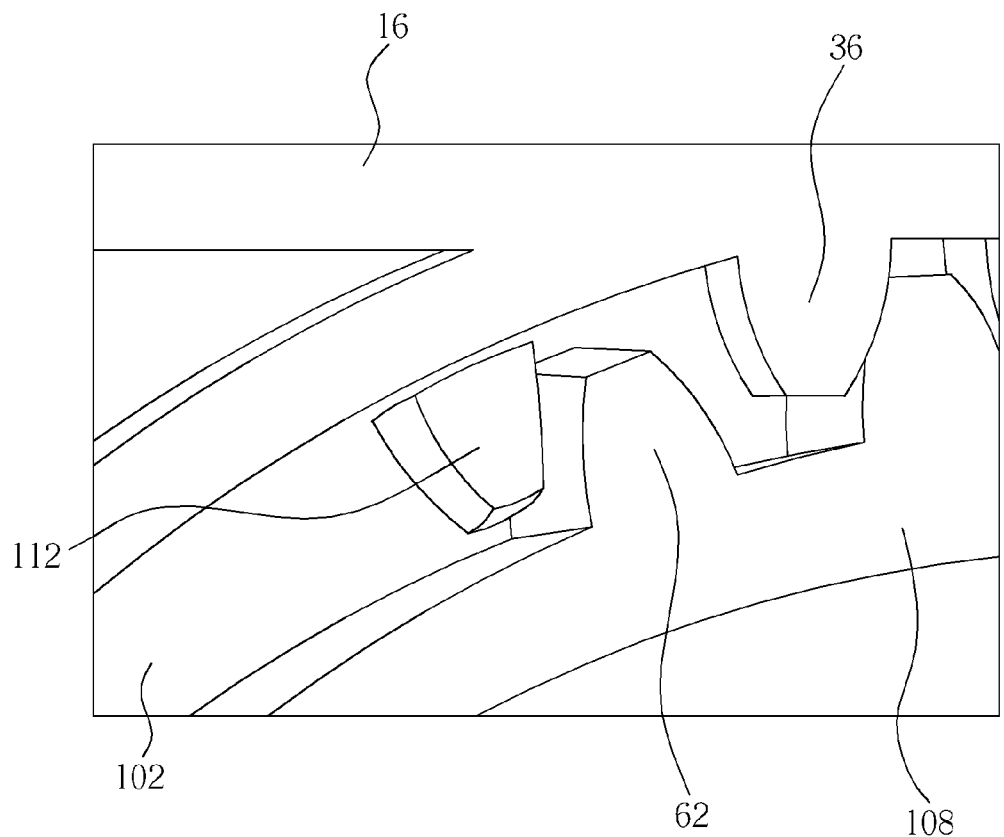
FIG. 12 is an enlarged diagram of the driving part being located at a locking position relative to the backrest.
Figure 13:
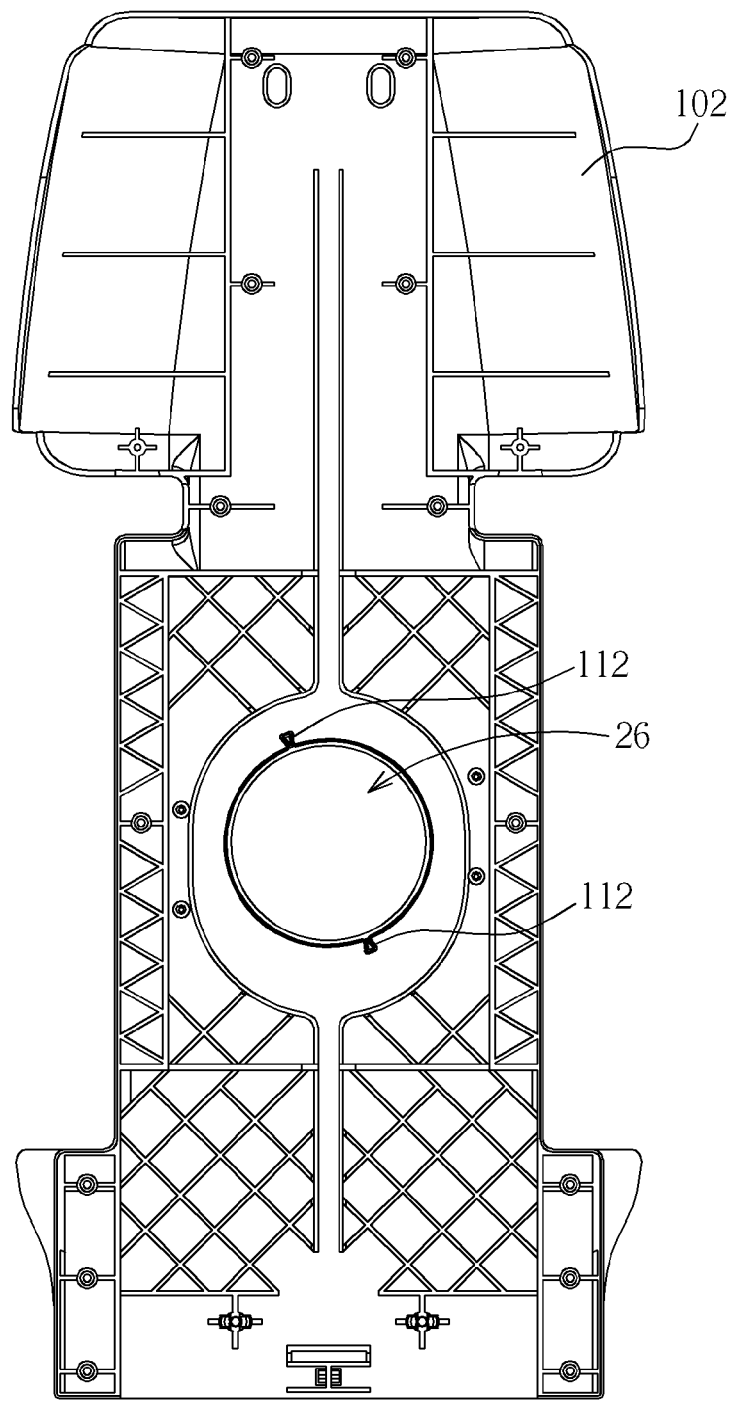
FIG. 13 is a front view of the backrest in FIG. 10.

Please refer to FIG. 10 and FIG. 11. FIG. 11 is a sectional diagram of the adjusting mechanism 104 being disposed in the backrest 102. The adjusting mechanism 104 includes a fixing base 106, a driving part 108, and a spring 110. As shown in FIG. 11, the spring 110 is disposed between the fixing base 106 and the driving part 108. The spring 110 is used for providing elastic force to the driving part 108 so that the driving part 108 can be movable relative to the fixing base 106. Furthermore, please refer to FIG. 12, which is an enlarged diagram of the driving part 108 being located at a locking position relative to the backrest 102. As shown in FIG. 12, a blocking structure 112 is formed on the backrest 102. A position of the blocking structure 112 relative to the backrest 102 is as shown in FIG. 13, which is a front view of the backrest 102 in FIG. 10. The blocking structure 112 is used for abutting against the first gear structure 62 when the driving part 108 moves to the locking position as shown in FIG. 11, so that rotation of the driving part 108 relative to the backrest 102 can be constrained. The same structure may also be located at another position on the backrest 102 corresponding to the second gear structure 64.

Figure 14:
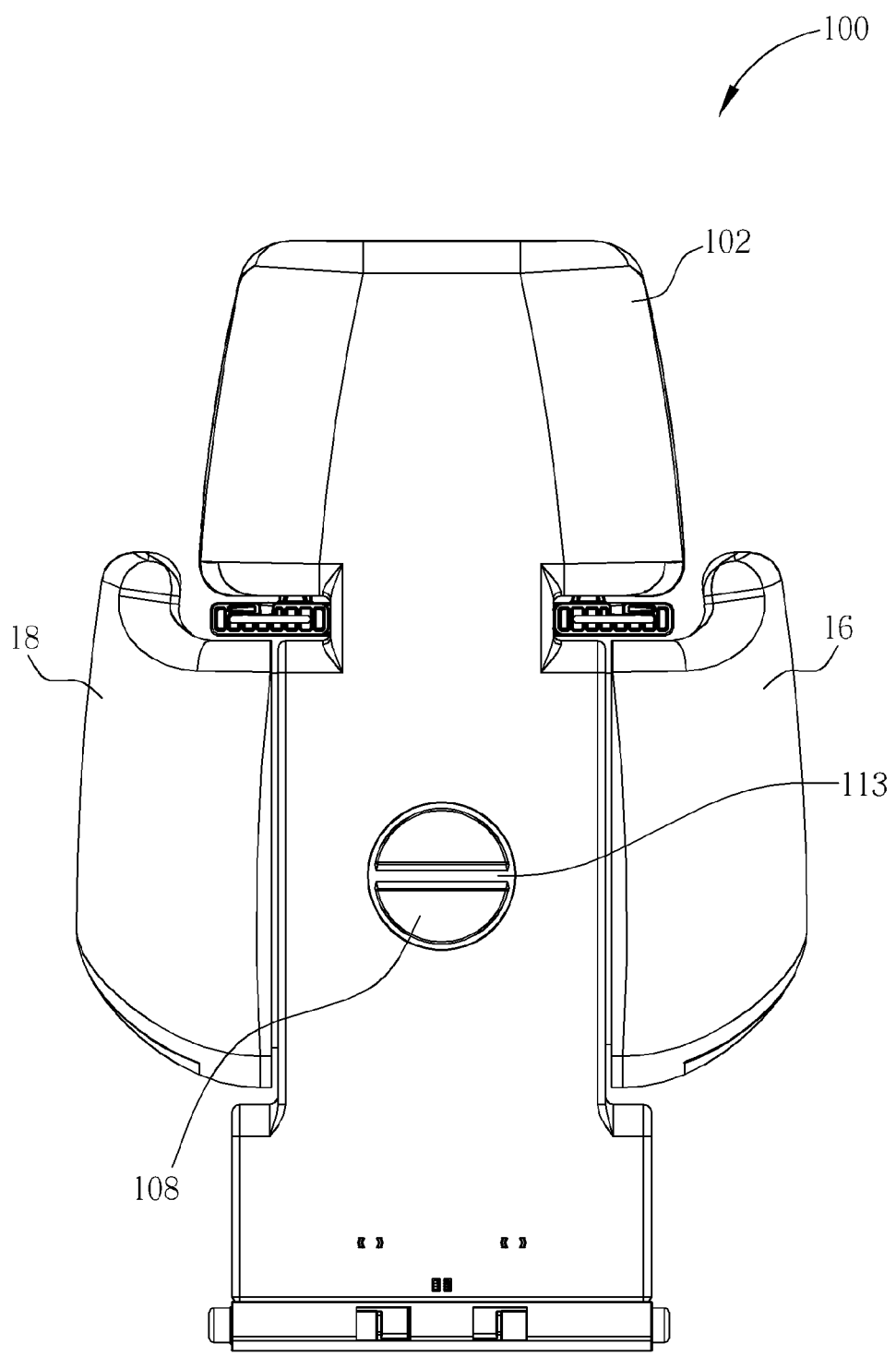
FIG. 14 is a back view of the child safety seat in FIG. 10 after being assembled.

More detailed description for wing-width adjustment of the child safety seat 100 is provided as follows. Please refer to FIG. 11, FIG. 12, and FIG. 14. FIG. 14 is a back view of the child safety seat 100 in FIG. 10 after being assembled. When the first side wing 16 and the second side wing 18 are respectively located at a position as shown in FIG. 14 relative to the backrest 102, meaning that the first side wing 16 and the second side wing 18 are both in an unexpanded state, a position of the driving part 108 relative to the backrest 102 is as shown in FIG. 11. At this time, the spring 110 is in a precompressed state. That is, the driving part 108 is engaged with the blocking structure 112 by elastic force provided from the spring 110 (as shown in FIG. 12). Thus, rotation of the driving part 108 relative to the backrest 102 can be constrained so as to fix the first side wing 16 and the second side wing 18 at a position as shown in FIG. 14. In such a manner, when a child sits on the child safety seat 100, the child safety seat 100 can utilize the first side wing 16 and the second side wing 18 to provide both sides of the child with a steady support.

Figure 15:
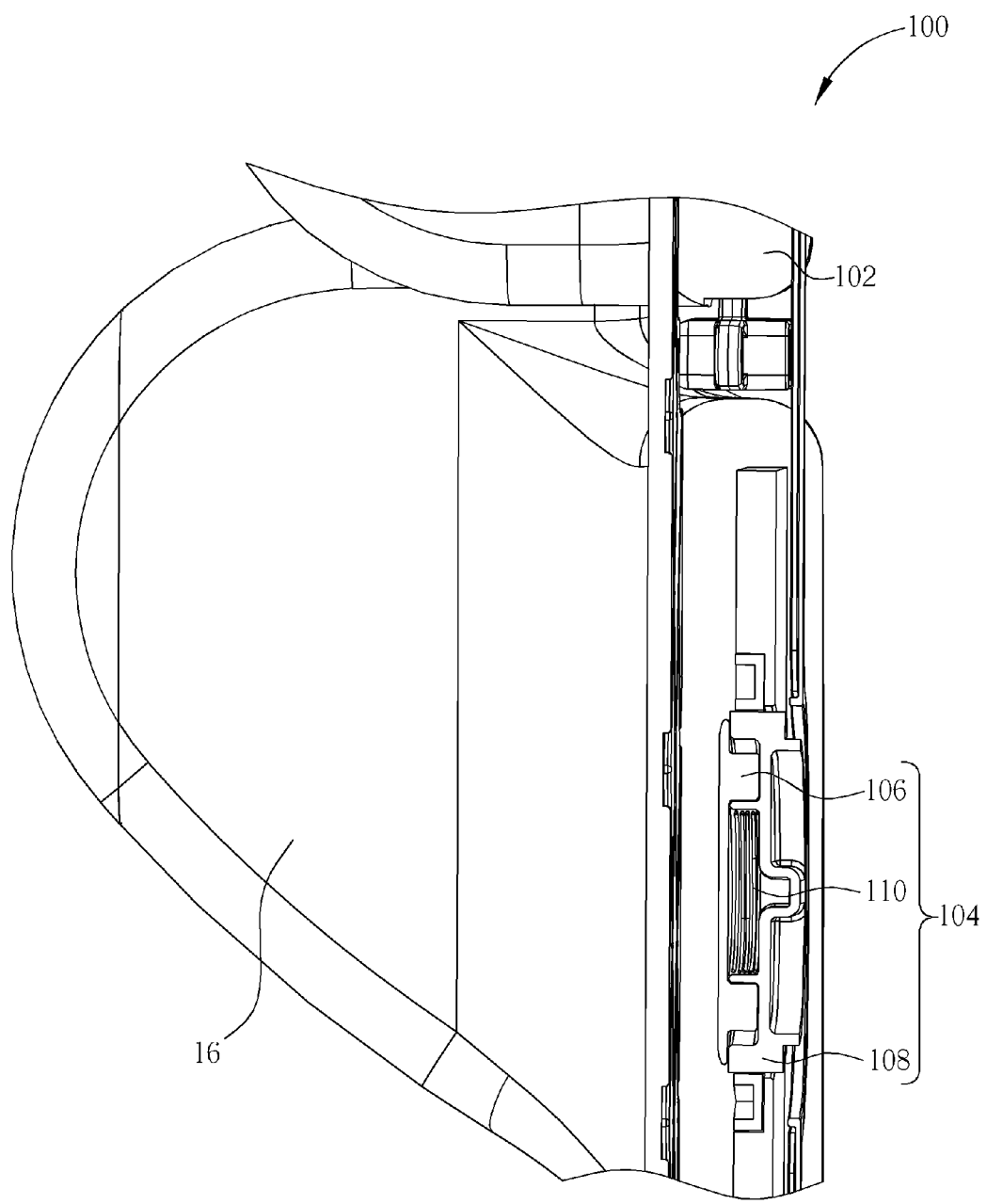
FIG. 15 is a sectional diagram of the driving part in FIG. 11 moving to an unlocking position.
Figure 16:
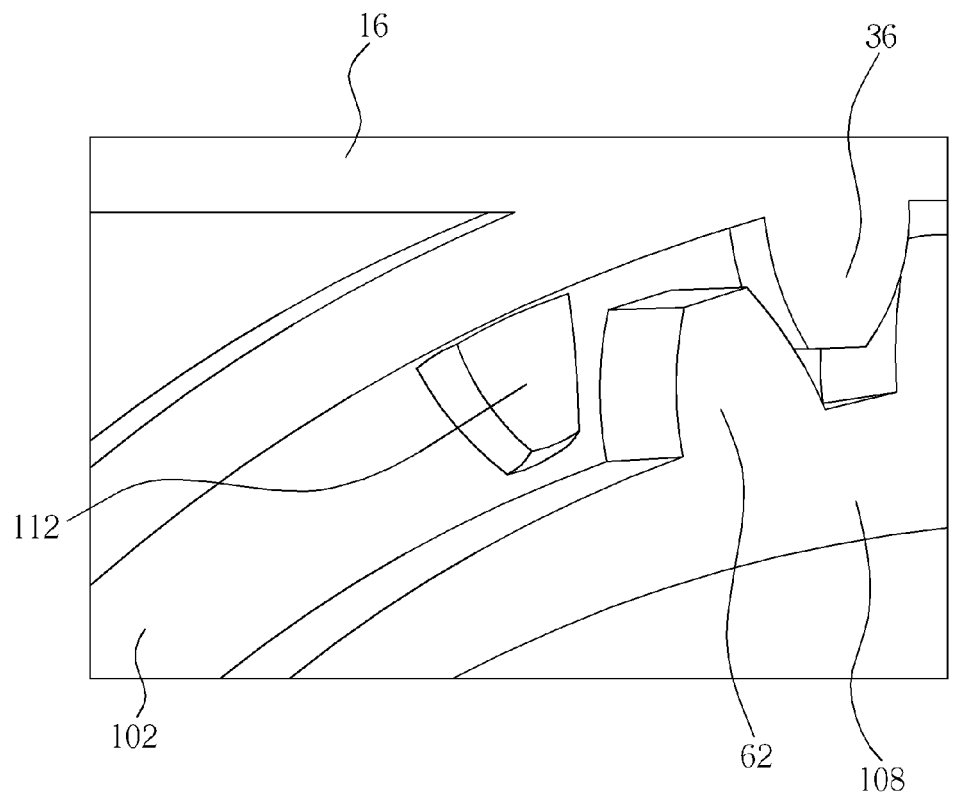
FIG. 16 is an enlarged diagram of the driving part in FIG. 15 being located at the unlocking position.
Figure 17:
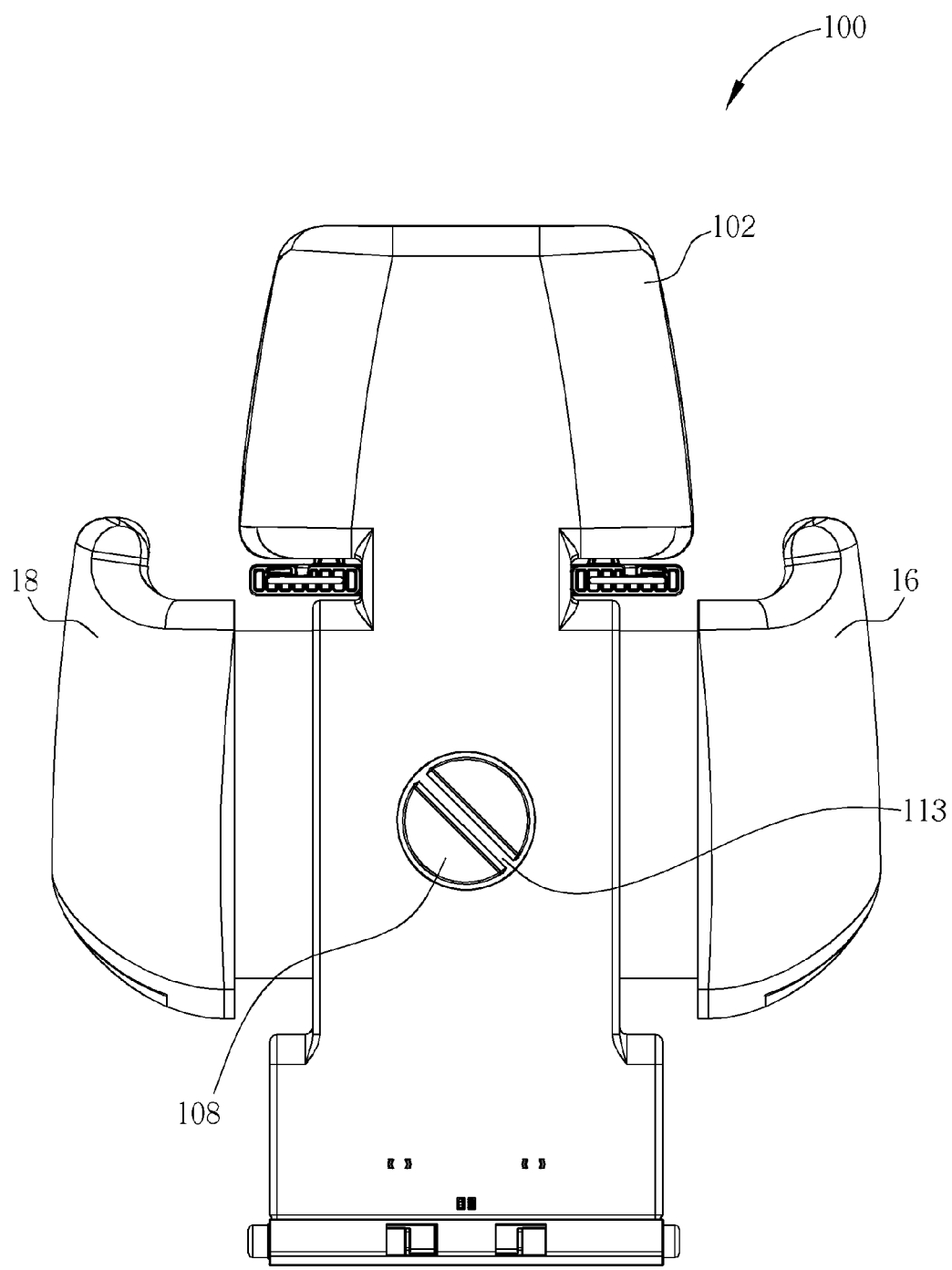
FIG. 17 is a diagram of the driving part in FIG. 14 rotating relative to the backrest.

Next, please refer to FIG. 11, FIG. 14, FIG. 15, FIG. 16, and FIG. 17. FIG. 15 is a sectional diagram of the driving part 108 in FIG. 11 moving to an unlocking position. FIG. 16 is an enlarged diagram of the driving part 108 in FIG. 15 being located at the unlocking position. FIG. 17 is a diagram of the driving part 108 in FIG. 14 rotating relative to the backrest 102. When a user wants to expand widths of the first side wing 16 and the second side wing 18 relative to the backrest 102 so that the child safety seat 100 can provide a larger seating space, the user just needs to press the driving part 108 in FIG. 14 (e.g. pressing an actuating part 113 in FIG. 14) to move the driving part 108 from the locking position as shown in FIG. 11 to the unlocking position as shown in FIG. 15. It should be noted that the actuating part 113 and the driving part 108 are formed integrally in this embodiment. Subsequently, since the blocking structure 112 is no longer engaged with the driving part 108 (as shown in FIG. 16), the driving part 108 can rotate relative to the backrest 102 accordingly. Next, the user just needs to grasp the actuating part 113 to rotate the driving part 108 clockwise from the position as shown in FIG. 14, so as to expand widths of the first side wing 16 and the second side wing 18 relative to the backrest 102. As for linkage of the first gear structure 62 and the second gear structure 64 relative to the first rack structure 36 and the second rack structure 38, the related description is omitted herein since it is the same as that mentioned in the first embodiment.

Next, the user can rotate the driving part 108 to move the first side wing 16 and the second side wing 18 to a proper position relative to the backrest 102. For example, the user can rotate the driving part 108 to a position as shown in FIG. 17 relative to the backrest 102 and then stop pressing the driving part 108. Subsequently, the driving part 108 is pushed back to the backrest 102 by elastic force provided from the spring 110 so that the first gear structure 62 can be engaged with the blocking structure 112 to constrain rotation of the driving part 108 relative to the backrest 102. In such a manner, the first side wing 16 and the second side wing 18 can be fixed at the position as shown in FIG. 17 so that the wing width of the child safety seat 100 can be increased accordingly.

Figure 18:
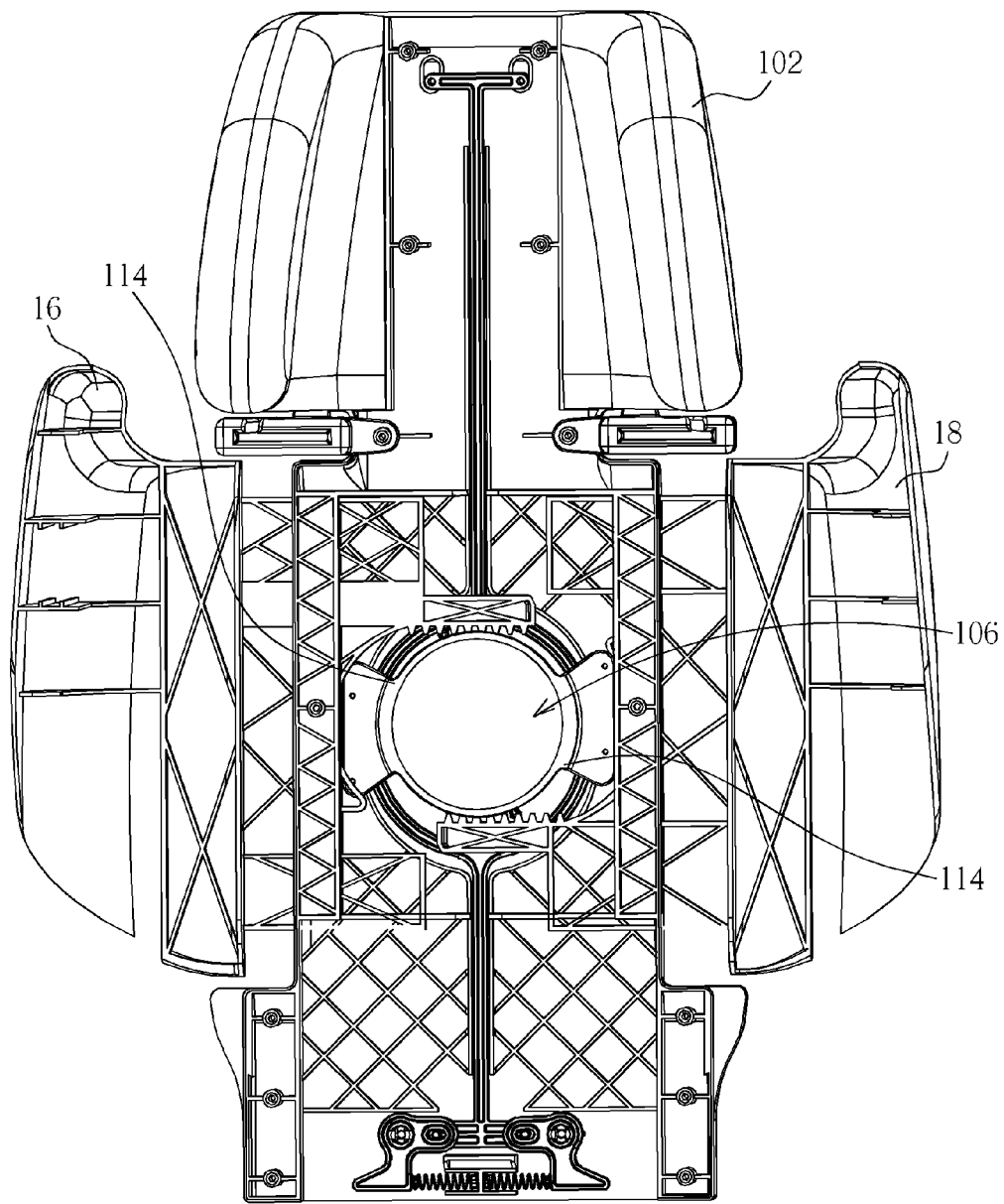
FIG. 18 is a diagram of the fixing base being disposed on the backrest.
Figure 19:
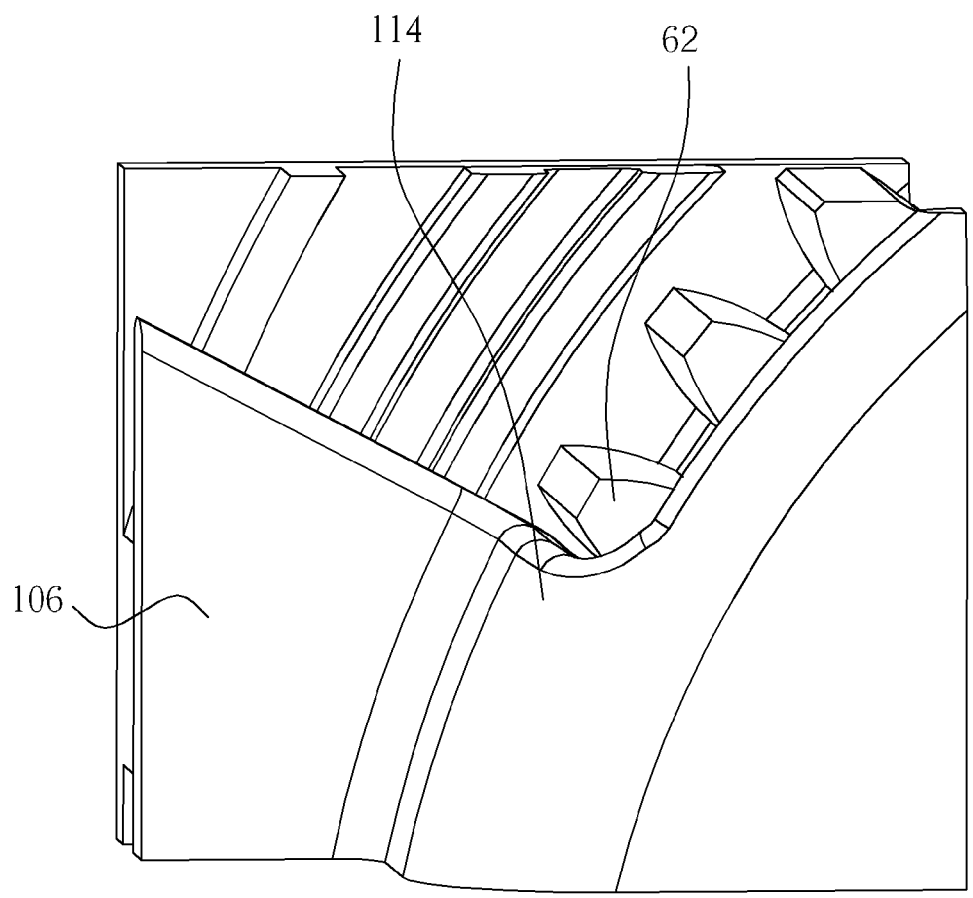
FIG. 19 is an enlarged diagram of the limit part in FIG. 18 abutting against the first gear structure.

Next, please refer to FIG. 18, which is a diagram of the fixing base 106 being disposed on the backrest 102. As shown in FIG. 18, a limit part 114 is formed on both sides of the fixing base 106, respectively. The limit parts 114 are used for abutting against the first gear structure 62 and the second gear structure 64, respectively, so that rotation range of the driving part 108 relative to the backrest 102 can be constrained. A method for abutting against the first gear structure 62 and the second gear structure 64 may preferably be as shown in FIG. 19, which is an enlarged diagram of the limit part 114 in FIG. 18 abutting against the first gear structure 62. Thus, the user may only adjust the widths of the first side wing 16 and the second side wing 18 relative to the backrest 102 within a proper range, so as to prevent damage of the child safety seat 100 caused by wrong operations.

Next, if the user wants to adjust the expanded wing-width of the child safety seat 100 back to the width as shown in FIG. 14, the user just needs to grasp the actuating part 113 again and then press the driving part 108. Subsequently, the user needs to rotate the driving part 108 counterclockwise from the position as shown in FIG. 17 to the position as shown in FIG. 14. Similarly, linkage of the first gear structure 62 and the second gear structure 64 relative to the first rack structure 36 and the second rack structure 38 is the same as that mentioned in the first embodiment, and the related description is therefore omitted herein.

Subsequently, the spring 110 provides elastic force to the driving part 108 to make the first gear structure 62 be engaged with the blocking structure 112 again, so as to constrain rotation of the driving part 108 relative to the backrest 102. In such a manner, the first side wing 16 and the second side wing 18 can be fixed at the position as shown in FIG. 14 so that the expanded wing width of the child safety seat 100 can be adjusted back to the width as shown in FIG. 14.

In summary, the child safety seat 100 utilizes engagement of the driving part 108, the first side wing 16, the second side wing 18, and the backrest 102 to adjust the widths of the first side wing 16 and the second side wing 18 relative to the backrest 102. In such a manner, if the user wants to adjust the widths of the first side wing 16 and the second side wing 18 relative to the backrest 102, the user just needs to perform the said process sequentially to rotate the driving part 108 relative to the backrest 102 so as to make the child safety seat 100 capable of providing a proper seating space to fit the child's size.

The child safety seat provided by the present invention utilizes linkage of the adjusting mechanism, the side wings, and the backrest as mentioned above to achieve the purpose of wing-width adjustment. In such a manner, via simple engaging design, the present invention may not only solves the problem that the wing width of the former child safety seat is not adjustable, but may also allow a user to finish the wing-width adjustment process easily through simple operations so as to increase operational convenience of the child safety seat in wing-width adjustment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
   a seat body;
   a backrest connected to the seat body, a hole being formed on the backrest and a first slot being formed on a first side of the backrest;
   a first side wing movably disposed through the first slot; and
   an adjusting mechanism movably disposed in the hole of the backrest and movably connected to the first side wing, the adjusting mechanism having an actuating part comprising an engaging part and a spring, the adjusting mechanism comprising:
      a fixing base disposed on the backrest and forming a containing space with the hole together, the engaging part movably sheathing a first positioning pillar of the fixing base, the spring being disposed between the engaging part and the first positioning pillar; and
      a driving part movably disposed in the containing space, protrusively disposed on the backrest, and movably connected to the first side wing, the driving part comprising a first hole;

wherein the actuating part is operable for driving the first side wing to move relative to the first slot telescopically, and the spring is used for providing the engaging part with elastic force to make the engaging part be engaged with the first hole so as to constrain rotation of the driving part relative to the backrest.

2. The child safety seat of claim 1, wherein the driving part has a first gear structure, the first side wing has a first rack structure, and the first gear structure is used for engaging with the first rack structure.

3. The child safety seat of claim 2, wherein a limit part is formed on the fixing base for abutting against the first gear structure to constrain rotation of the driving part relative to the backrest.

4. The child safety seat of claim 1, wherein a second positioning pillar is formed on the fixing base, and the driving part is pivoted to the second positioning pillar so that the driving part can rotate relative to the fixing base.

5. The child safety seat of claim 1, wherein a rib is formed on the engaging part for abutting against the edge of the first hole when the engaging part is engaged with the first hole.

6. The child safety seat of claim 1, wherein the driving part further comprises a second hole, and the driving part alternatively switches the engaging part to engage with the first hole or the second hole when rotating relative to the backrest.

7. The child safety seat of claim 6, wherein two protruding pillars are formed on the fixing base, the two protruding pillars are disposed at two sides of the first positioning pillar, respectively, and one of the two protruding pillars covers one of the first hole and the second hole when the engaging part is engaged with the other one of the first hole and the second hole.

8. The child safety seat of claim 1, wherein the child safety seat further comprises a second side wing, the backrest further comprises a second slot, the second side wing is movably connected to the adjusting mechanism so that the second side wing is capable of moving relative to the second slot telescopically, and the motion direction of the first side wing is opposite to that of the second side wing.

9. The child safety seat of claim 8, wherein the second side wing has a second rack structure, the driving part has a second gear structure, and the second gear structure is used for engaging with the second rack structure.

10. The child safety seat of claim 1 further comprising a backrest lid disposed on the backrest for covering the adjusting mechanism.

11. The child safety seat of claim 10 further comprising a protection pad disposed on the backrest lid.

12. The child safety seat of claim 11, wherein the protection pad is made of flexible rubber material or expandable plastic material.

13. A child safety seat comprising:
   a seat body;
   a backrest connected to the seat body, a hole being formed on the backrest and a first slot being formed on a first side of the backrest;
   a first side wing movably disposed through the first slot and having a first rack structure; and
   an adjusting mechanism movably disposed in the hole of the backrest and movably connected to the first side wing, the adjusting mechanism having an actuating part and comprising:
      a fixing base disposed on the backrest and forming a containing space with the hole together;
      a driving part movably disposed in the containing space, protrusively disposed on the backrest, and movably connected to the first side wing, the driving part having a first gear structure for engaging with the first rack structure; and a spring disposed between the fixing base and the driving part, for providing the driving part with elastic force so that the driving part can move between a locking position and an unlocking position, the first gear structure being engaged with the first rack structure when the driving part moves to the unlocking position;

wherein the actuating part is operable for driving the first side wing to move relative to the first slot telescopically.

14. The child safety seat of claim 13, wherein a blocking structure is formed on the backrest for abutting against the first gear structure to constrain rotation of the driving part relative to the backrest when the driving part moves to the locking position.

15. The child safety seat of claim 13, wherein the child safety seat further comprises a second side wing, the backrest further comprises a second slot, the second side wing is movably connected to the adjusting mechanism so that the second side wing is capable of moving relative to the second slot telescopically, and the motion direction of the first side wing is opposite to that of the second side wing.

16. The child safety seat of claim 15, wherein the second side wing has a second rack structure, the driving part has a second gear structure, and the second gear structure is used for engaging with the second rack structure.

17. The child safety seat of claim 13, wherein the driving part and the actuating part are formed integrally.

18. The child safety seat of claim 13 further comprising a backrest lid disposed on the backrest for covering the adjusting mechanism.

19. The child safety seat of claim 18 further comprising a protection pad disposed on the backrest lid.

20. The child safety seat of claim 19, wherein the protection pad is made of flexible rubber material or expandable plastic material.

* * * * *